US008623460B2

(12) United States Patent
Bahls

(10) Patent No.: US 8,623,460 B2
(45) Date of Patent: Jan. 7, 2014

(54) ADHESION PROMOTER

(75) Inventor: Harry J. Bahls, North Haven, CT (US)

(73) Assignee: Valspar Sourcing, Inc., Minneapolis, MN (US)

(*) Notice: Subject to any disclaimer, the term of this patent is extended or adjusted under 35 U.S.C. 154(b) by 756 days.

(21) Appl. No.: 11/919,904

(22) PCT Filed: Mar. 29, 2006

(86) PCT No.: PCT/US2006/011521
§ 371 (c)(1),
(2), (4) Date: Nov. 13, 2008

(87) PCT Pub. No.: WO2006/121517
PCT Pub. Date: Nov. 16, 2006

(65) Prior Publication Data
US 2009/0068362 A1    Mar. 12, 2009

Related U.S. Application Data

(60) Provisional application No. 60/678,287, filed on May 6, 2005.

(51) Int. Cl.
*B05D 3/10* (2006.01)
*B05D 1/18* (2006.01)

(52) U.S. Cl.
USPC .................. 427/304; 427/305; 427/443.1

(58) Field of Classification Search
USPC .............. 427/462, 465, 437, 443.1, 304, 305, 427/162, 165; 359/584, 585
See application file for complete search history.

(56) References Cited

U.S. PATENT DOCUMENTS

| 4,255,214 | A | * | 3/1981 | Workens ........................ 148/269 |
| 4,285,992 | A | * | 8/1981 | Buckwalter, Jr. ............. 427/165 |
| 4,702,838 | A | * | 10/1987 | Babcock et al. .............. 210/638 |
| 6,017,580 | A | * | 1/2000 | Soltys ............................ 427/162 |
| 6,147,803 | A | | 11/2000 | Laroche et al. |
| 6,348,533 | B1 | * | 2/2002 | Kishimoto et al. ........... 524/398 |
| 6,398,854 | B1 | * | 6/2002 | Aonuma ....................... 106/1.19 |
| 2001/0033935 | A1 | * | 10/2001 | Laroche et al. .............. 428/432 |

FOREIGN PATENT DOCUMENTS

| EP | 913498 A1 * | 5/1999 |
| EP | 1 577 277 A1 | 9/2005 |
| WO | 2004/113247 A1 | 12/2004 |
| WO | 2005/090256 A1 | 9/2005 |

OTHER PUBLICATIONS

Notification of Transmittal of the International Search Report and the Written Opinion of the International Searching Authority, or the Declaration, for corresponding patent application No. PCT/US2006/011521, mailed Sep. 5, 2006, 12 pages.
Reply to Written Opinion for corresponding patent application No. PCT/US2006/011521, filed Mar. 6, 2007, 14 pages.
International Preliminary Report on Patentability for corresponding patent application No. PCT/US2006/011521, dated May 15, 2007, 9 pages.

* cited by examiner

*Primary Examiner* — Dah-Wei Yuan
*Assistant Examiner* — Nga Leung V Law
(74) *Attorney, Agent, or Firm* — Valspar Sourcing, Inc.

(57) ABSTRACT

The present invention refers to a method of making an copper-free article having a metal coating deposited on a substrate comprising: providing a substrate; contacting a surface of said substrate with a solution comprising: at least one metal ion selected from the group consisting of Ce, Pr, Nd, Eu, Er, Ga, W, Al, Mn, Mo, Sb, Te, La, Sm or their mixtures; and applying a metal coating on said surface of said substrate. In another embodiment the present invention refers to a method of making a metal coated article: providing a substrate; contacting a surface of said substrate with a solution comprising a mixture of more than one metal ion selected from the same group as listed above; or contacting said surface of said substrate with more than one solution comprising in each solution at least one metal ion selected from the same group; and applying a metal coating on said surface of said substrate. Moreover, the present invention refers to a method of making a metal coated article comprising: providing a substrate; contacting a surface of said substrate with a solution comprising a Bi metal ion, and applying a metal coating on said activated surface of said substrate. Furthermore an article obtainable by any of said methods, is claimed.

18 Claims, No Drawings

ADHESION PROMOTER

This application claims the benefit of the filing date of U.S. Provisional Application No. 60/678,287, filed May 6, 2005.

TECHNICAL FIELD

This invention relates to articles comprising a metal coating, preferably a reflective metal coating, deposited on a substrate, such as a vitreous substrate or a plastic substrate and to methods of manufacturing such articles. Especially, this invention relates to a new activation (supersensitizing) method which enhances the adhesion of the metal coating, preferably a reflective metal coating, deposited on the substrate and to the articles produced by that method.

BACKGROUND

For convenience, the following description will be mainly directed to mirrors and improving the adhesion of the reflective layer used to make the mirror but it will be understood by those skilled in the art that other substrates (whether planar or not) may be treated using the teaching of the present invention to enhance the adhesion of metal to the substrate.

Conventional mirrors can be made by a process in which a thin layer of a reflective metallic film is applied onto a substrate, typically glass or plastic. Mirrors are generally made continuously by a sequence of steps on a mirror conveyor. The first step lightly polishes and cleans the glass surface and after rinsing, the next step sensitizes the surface e.g. with an aqueous stannous chloride solution. The metal deposited on the substrate is typically silver, although other metals or metal compositions may be used. The silver film layer is deposited on the sensitized glass surface by one of many methods such as described in U.S. Pat. No. 4,737,188 to Bahls. In one typical process, an ammoniacal silver nitrate solution and a reducing agent solution containing a strong base are sprayed on and combined at the sensitized glass surface to deposit the silver film.

If air, water, contaminants, chemicals such as alkaline or acidic and other glass cleaners, or other compounds, come in contact with the reflective metallic film, the film may corrode, oxidize, or lose contact with the glass. To protect the film and reduce damage to the metallic layer, a protective overlay of copper may be applied over the metallic film, and/or a protective paint may be applied. This copper film may be applied to and over the silver film by any of a variety of prior art procedures such as a galvanic process which utilizes an aqueous suspension of iron powder and an aqueous solution of copper sulfate or by the disproportionation of cuprous ions on the silver surface. The latter process is described in U.S. Pat. No. 5,419,926 to Soltys. The copper layer is normally painted to produce the finished mirror, or another protective coating such as a hardened organic resin incorporating a corrosion inhibitor may likewise be applied as shown in U.S. Pat. No. 5,156,917 to Sanford. A standard mirror making process thus comprises a series of steps which steps are performed in sequence on a conveyor as part of a continuous mirror making process.

Historically, a serious problem of the mirror manufacturing industry was the need for the copper layer on the silver layer to inhibit corrosion of the silver and increase adhesion of the paint. The application of copper to the silver surface necessarily produces copper containing waste streams which must be environmentally treated or processed for recycling. Typically, the copper streams are treated to remove copper before discharge to the effluent and this procedure is complex and costly. The copper film on the mirror is also a weak link in the life of a conventional mirror. The copper film is easily corroded when the mirror is subjected to ammonia or alkaline glass cleaners because these cause the edges of mirrors to corrode and turn black in color thereby shortening the life of the mirror.

In the seventies researchers found a method of improving the adhesion of metallic silver or copper films on surfaces like glass (e.g. A. Ya Kuznetsov, et al. in Sov. J. Opt. Technol. 42, 1975, 604). By "activating" a glass surface sensitized with tin dichloride with a $PdCl_2$ solution a markedly improved adhesion has been recognized. Furthermore, it has been realized that corrosion protection may also be enhanced by improving adhesion between the layer of the reflective metal and the substrate. This finding helped to overcome the above mentioned problem of the mirror manufacturing industry. Due to the improved adhesion of the metallic silver film on the substrate the need for protective coatings (e.g. the copper layer mentioned above) overlying the metallic layer has been eliminated. The mirror manufacturing industry now used Pd-based activation (supersensitizing) to produce so called "copper-free mirrors". Although this "activating step" works well it adds a serious cost factor to the mirror producing process.

Bearing in mind the problems and deficiencies of the prior art, in one embodiment it is an object of the present invention to provide a method for enhancing the adhesion of a metal coating deposited on a substrate wherein the prior art processes are replaced with a lower applied cost process. Advantageously, the inventive process may be used in existing commercial mirror making conveyor systems without having to add extra sections to the system.

In another embodiment it is an object of the invention to provide a metal-coated substrate, e.g., a mirror, and other metal coated substrates and metal coated articles of manufacture having improved adhesion between the metal coating and the substrate, which metal-coated substrate and metal coated articles of manufacture are produced with lower applied cost. Preferably, said metal-coated substrates and metal coated articles of manufacture provided by the present invention do not contain a copper layer, which is understood in the framework of this invention as copper-free.

Still other objects and advantages of the invention will in part be apparent from the specification.

SUMMARY OF THE INVENTION

The activation process of the invention enhances and promotes the adhesion of a metal coating, preferably a reflective metal coating, to highly smooth or polished substrates such as glass or plastic. This improved adhesion also improves the corrosion resistance of the metal coating and eliminates the need for a protective coating like the copper layer mentioned above, overlying the metal coating. Furthermore, the visual appeal of the final product is improved, as well as the performance and durability of the product over time. Advantageously, the use of the supersensitizer of the invention on copper free mirrors provides reduced edge failure when tested as specified below as well as mirrors which are substantially free of spot corrosion, often referred to as "white specks or spots." The term "substantially free of" indicates that a 225 $cm^2$ sample has no more than 5 spots greater than 0.5 mm in size, preferably not more than 3 spots, more preferably not more than 1 spot.

According to one aspect the present invention provides a method of making a copper-free article having a metal coating deposited on a substrate comprising:

providing a substrate;

contacting a surface of said substrate with a solution comprising at least one metal ion selected from the group consisting of Ce, Pr, Nd, Eu, Er, Ga, W, Al, Mn, Mo, Sb, Te, La and Sm, or mixtures of said metal ions; and applying a metal coating on said activated surface of said substrate.

According to a second aspect the present invention provides a method of making an article having a metal coating deposited on a substrate comprising:

providing a substrate;

contacting a surface of said substrate with a solution comprising a mixture of more than one metal ion selected from the group consisting of Ce, Pr, Nd, Eu, Er, Ga, W, Al, Mn, Mo, Sb, Te, La, or Sm; or contacting said surface of said substrate with more than one solution comprising in each solution at least one metal ion selected from the group consisting of Ce, Pr, Nd, Eu, Er, Ga, W, Al, Mn, Mo, Sb, Te, La, or Sm; and applying a metal coating on said activated surface of said substrate.

According to a third aspect the present invention provides a method of making an article having a metal coating deposited on a substrate comprising:

providing a substrate;

contacting a surface of said substrate with a solution comprising at least one metal ion selected from the group consisting of Ga, W, Al, Mn, Mo, Sb, Te, or mixtures of said metal ions; and applying a metal coating on said activated surface of said substrate.

According to a fourth aspect the present invention provides a method of making an article having a metal coating deposited on a substrate comprising:

providing a substrate;

contacting a surface of said substrate with a solution comprising a Bi metal ion at basic pH, optionally in combination with ammoniacal silver ions; and applying a metal coating on said activated surface of said substrate.

According to a fifth aspect an article is provided having a metal coating (preferably a reflective metal coating) on a substrate, which article is obtainable by any of the methods of said first to fourth aspect.

According to a sixth aspect of the invention, there is provided a mirror comprising a substrate, e.g. glass or plastic, carrying a silver coating obtainable by any of the methods of said first to fourth aspect. Such a mirror carrying a silver coating produced by any of the first to fourth aspect of the invention does not need to be covered with a protective layer of copper. Due to the inventive activation process the silver coating adheres well to the substrate and has good durability. Therefore, according to a preferred embodiment of the present invention a mirror carrying a silver coating produced by any of the first to fourth aspect of the invention does not comprise a protective layer of copper, i.e., is a copper-free mirror.

Nevertheless, the mirrors, especially the copper-free mirrors, according to the present invention can be finished according to conventional processes (e.g., when using tin passivation and suitable paint overcoating as described herein) or, preferably, are finished as described in Applicants' co-pending patent application (U.S. application Ser. No. 11/919,785 filed Mar. 29, 2006), which application is herein incorporated by reference. More specifically, the mirrors, especially the copper-free mirrors, according to the present invention can be treated such that the metal coated substrate is contacted with a treating composition comprising a film forming organic component, which treating composition forms a hydrophobic film on the metal coated substrate with a thickness of less than 1 µm. In a preferred embodiment contacting the metal coated substrate with said treating composition comprising a film forming organic component as described above causes an increase of the surface tension of the metal coated substrate.

Alternatively, according to Applicants' co-pending patent application (U.S. application Ser. No. 11/919,785 filed Mar. 29, 2006), the mirrors, especially the copper-free mirrors, according to the present invention can be treated such that the metal coated substrate is contacted with a treating composition comprising a film forming organic component selected from the group consisting of an aromatic triazole compound, a silicone resin and mixtures thereof.

The silver coating, e.g., after finishing it, may be covered with one or more protective paint layers as known in the art and according to a preferred aspect of this invention such a paint is free, or substantially free, of lead.

DETAILED DESCRIPTION OF THE PREFERRED EMBODIMENTS

According to one embodiment of the present invention a method of making a copper-free article having a metal coating deposited on a substrate is provided which method enhances and promotes the adhesion of the metal coating, preferably a reflective metal coating, to the substrate like a highly smooth or polished glass or plastic. This method comprises:

providing a substrate;

contacting a surface of said substrate with a solution comprising at least one metal ion selected from the group consisting of Ce, Pr, Nd, Eu, Er, Ga, W, Al, Mn, Mo, Sb, Te, La, Sm or mixtures of said metal ions; and applying a metal coating, preferably a reflective metal coating, on said activated surface of said substrate.

According to a second embodiment of the present invention a method of making an article having a metal coating deposited on a substrate is provided which method enhances and promotes the adhesion of the metal coating, preferably a reflective metal coating, to the substrate like a highly smooth or polished glass or plastic. This method comprises:

providing a substrate;

contacting a surface of said substrate with a solution comprising a mixture of more than one metal ion selected from the group consisting of Ce, Pr, Nd, Eu, Er, Ga, W, Al, Mn, Mo, Sb, Te, La, or Sm; or contacting said surface of said substrate with more than one solution comprising in each solution at least one metal ion selected from the group consisting of Ce, Pr, Nd, Eu, Er, Ga, W, Al, Mn, Mo, Sb, Te, La, or Sm; and applying a metal coating on said activated surface of said substrate.

According to a third embodiment of the present invention a method of making an article having a metal coating deposited on a substrate is provided which method enhances and promotes the adhesion of the metal coating, preferably a reflective metal coating, to the substrate like a highly smooth or polished glass or plastic. This method comprises:

provide a substrate;

contacting a surface of said substrate with a solution comprising at least one metal ion selected from the group consisting of Ga, W, Al, Mn, Mo, Sb, Te, or mixtures of said metal ions; and applying a metal coating on said activated surface of said substrate.

Preferably, the at least one metal ion as mentioned above in one of the preferred embodiments is selected from the group consisting of Ce(III), Ce(IV) Pr(III), Nd(III), Eu(III), Er(III), Ga(II), W(II), W(IV), Al(III), Mn(II), Mo(IV), Mo(VI), Sb(III), Te(IV), La(III), Sm(M) or mixtures of said metal ions.

According to a fourth embodiment of the present invention a method of making an article having a metal coating deposited on a substrate is provided which method enhances and promotes the adhesion of the metal coating, preferably a reflective metal coating, to the substrate like a highly smooth or polished glass or plastic. This method comprises: providing a substrate;

contacting a surface of said substrate with a solution comprising a Bi metal ion at basic pH, optionally in combination with ammoniacal silver ions; and applying a metal coating on said activated surface of said substrate.

Preferably, the Bi metal ion used is Bi(III).

In a preferred embodiment the activation solution according to any of said first to said fourth embodiment comprises the at least one metal ion and an aqueous carrier. Suitable "aqueous carrier" as used according to the present invention include carriers which comprise water in more than 50% by weight, preferably more than 80% by weight. As a further component a cosolvent (e.g., a lower alcohol having 1 to 4 carbon atoms or a lower ketone having 3 or 4 carbon atoms) can be used in an amount of less than 50% by weight, preferably less than 20% by weight. In a preferred embodiment the aqueous carrier is water.

Preferably the activation solution of the present invention comprises the at least one metal cation and a compound forming a complex with the cation and/or an anion. Suitable anions are selected from the group consisting of $Cl^-$, $F^-$, $Br^-$, $I^-$, $SO_4^{2-}$, $NO_3^-$, acetate, silicide, molybdate, tungstic acid anion, phosphonates. Preferred anions are selected from the group consisting of $Cl^-$, $SO_4^{2-}$ and $NO_3^-$. Suitable complex forming compounds are selected from the group consisting of $Cl^-$, $F^-$; complexing acids like ethylenediaminetetraacetic acid (EDTA) or citric acid; carbohydrates; and sugars like glucono-delta-lactone (GDL-one).

Preferable the at least one ion is provided as a salt of the at least one cation and at least one anion. This salt preferably is present in the aqueous carrier in a concentration of 0.01 to 3 mmol/l based on the at least one ion, preferably in a concentration of 2 to 3 mmol/l. It has been observed that bringing the substrate, e.g., glass, into contact with a quantity of from 0.01 mmol/l is entirely sufficient to activate the substrate effectively. In fact, it has been observed that the use of quantities above 3 mmol/l of the at least one ion does not afford any significant improvement. Generally, 0.1 to 550 mg/m$^2$, preferably 1.0 to 300 mg/m$^2$ and more preferably 1.5 to 50 mg/m$^2$ of the at least one ion is used per m$^2$ substrate.

With respect to the first, second and third embodiment of the present invention it has been found that best results can be obtained when the pH of said activating solution is from 2.0 to 7.0, preferably from 4.0 to 6.0. Usually, putting into solution the at least one ion provided, e.g., in form of a salt, in the aqueous carrier provides a suitable activation solution. In some cases (e.g. using Te as the at least one ion), it might be appropriate to control the pH of the activation solution by adding an acid, like a mineral acid, preferably hydrochloric acid, nitric acid or sulfuric acid. The above mentioned pH range allows solutions to be formed which are both stable and effective for activating the substrate. The inventive method according to this embodiments usually is carried out at or nearby room temperature (18-25° C.), although it can also be carried out at lower temperatures in the range of 1-18° C. or higher temperatures in the range of 25-40° C.

With respect to the fourth embodiment of the present invention it has been found that best results can be obtained when the pH of said activating solution is from 7.5 to 11, preferably from 8.0 to 10. This pH range allows solutions to be formed which are both stable and effective for activating the substrate. The inventive method according to this embodiment usually is carried out at or nearby room temperature (18-25° C.), although it can also be carried out at lower temperatures in the range of 1-18° C. or higher temperatures in the range of 25-40° C.

When according to the fourth embodiment the Bi metal ion at basic pH is used in combination with ammoniacal silver ions the ammoniacal silver ions are preferably formed by complexing ammonia (in the form of ammonium hydroxide) with silver nitrate to provide the silver diamine ion, $Ag(NH_3)_2^+$. Optionally, a complexing agent can be added to the solution of the invention to enhance the solubility of the metal ion and help keep the metal ion in solution during shelf storage by inhibiting precipitation. Suitable complexing agents include, but are not limited to, N-methyl-glucamine, glucosaminic acid, glucono-delta-lactone (GDL).

Preferably, the two components of the adhesion promoter composition (Bi ion and Ag ion) are made in a concentrated state. This enables storage and shipment to be done in the most economical fashion. Later dilution may be carried out prior to application. In the production line, each of the components may be further diluted for application. Generally, the final application will result in an application of 0.1 to 550 mg, preferably 1 to 300 mg, more preferably 1.5 to 50 mg of the silver ion per m$^2$ substrate. Likewise, the final application will also preferably result in an application of 0.1 to 550 mg, preferably 1 to 300 mg, more preferably 1.5 to 50 mg Bismuth ion per m$^2$ of substrate.

In preferred applications, the concentrated components are diluted prior to use in order to ensure an even application of the two components. This dilution enables better control of the application, and helps prevent over- or under-application of either component.

Depending on the method of application, the method of dilution may vary in order to achieve the proper concentration for application. One alternative is to premix and dilute the two compounds before application, and the compounds are fed together for application. This allows a large degree of mixing and reacting prior to application. Preferably, the two components will each be separately added into and diluted by the same water stream just prior to application onto the substrate. This enables the compounds to begin to mix just before they are sprayed. Another alternative is to dilute the compounds and spray them individually onto the substrate. This prevents mixing until the compounds are actually on the substrate, where the components will then mix.

Surprisingly good results can be obtained when, e.g. according to the second embodiment of the present invention, a mixture of the at least one metal ion selected from the group consisting of Ce(III), Ce(IV), Pr(III), Nd(III), Eu(III), Er(III), Ga(II), W(II), W(IV), Al(III), Mn(II), Mo(IV), Mo(VI), Sb(III), Te(IV), La(III), Sm(III) is used. Especially suitable mixtures, for example, can be formed with Ce(III) and Eu(III), Nd(III) and Mn(II), Nd(III) and Al(III), Pr(III) and Mn(II), Ce(III) and Al(III), Sm(III) and Ce(III), Te(IV) and Sm(III), and Te(IV) and Er(III). Most preferred mixtures are Ce(III) and Eu(III), Sm(III) and Ce(III), Te(IV) and Sm(III), and Te(IV) and Er(III). Usually the components are used in a molar ratio of 0.01:30 to 10:1, wherein a molar ratio of 1:10 to 10:1 is preferred.

However, the present invention is not limited to a mixture of two of the at least one metal ion. Three or even more of the at least one metal ion can be used in a mixture. Therefore, according to the present invention a mixture of the at least one metal ion e.g., in a molar ratio of 1 to 1 up to 1 to 10 can be used, wherein the ratio refers to the ratio of one given metal ion to the second, third, etc. The total amount of the at least one metal ion used is as described above.

Furthermore, surprisingly good results can be obtained when two different metal ions of the at least one metal ion of the first, second and third embodiment are applied one after another in two separate treating steps, optionally with a rinsing step in between. Preferred two different metal ions of the at least one metal ion are Ce(III) and Eu(III), Sm(III) and Ce(III), Te(IV) and Sm(III), and Te(IV) and Er(III). Usually the components are used in a molar ratio of 0.01:30 to 10:1, wherein a molar ratio of 1:10 to 10:1 is preferred. The order of application is not limited. The total amount of the at least one metal ion used is as described above. If Tellurium is used preferably it is applied first before the second metal ion is applied. Furthermore, preferably, tellurium is used in a lower content than the second metal ion. As indicated above a rinsing step between the application of the two metal ions is not essential. Therefore, after application of the first metal ion, without a subsequent rinsing step, one could wait few seconds (2-5 s) before the second metal ion is applied. However, it should be noted that the present invention is not limited to the application of only two of the at least one metal ions in consecutive manner—three or more of the at least one metal ions can be applied one after another in separate treating steps, optionally with a rinsing step in between.

The substrate according to the present invention include any substrates onto which a metal film or layer, preferably a reflective metal film or layer, can be applied. Exemplary substrates include, but are not limited to, substrates selected from vitreous products including ceramics or glass including soda lime glass and other conventional glass products used in mirror making manufacture; polymeric materials; and particles, e.g., metal particles. Suitable polymeric materials include thermoplastics, and thermosets such as polycarbonate, LEXAN, plexi-glass, lacquered materials (e.g. materials covered with an acryl lacquer), polyethylene, polymethacrylate, and other polymeric materials. Suitable particles according to the present invention comprise particles of the aforementioned materials as well as silver flakes and powders, metal (silver) coated mica, metal (silver) coated metal particles, e.g., Ni or Cu particles, and the like. All these substrates may be treated using the method of the invention to increase the corrosion resistance.

The activation treatment according to the invention may be effected on various types of vitreous substrates, for example on glass microbeads. The treatment according to the invention improves the adhesion of the metal coating, e.g., silver coating, subsequently deposited on the glass microbeads.

The substrate can be in a variety of shapes and need not be planar. It is important to select input materials carefully, and substrates of good quality should be used in order to get a superior final product. In a preferred embodiment the substrate is a sheet of glass used for mirror production.

According to the present invention the metal deposited on a substrate can be selected from silver, gold, copper, nickel, lead, ruthenium and chrome. Silver is preferred.

The substrate may be brought into contact with the activating solution by any known method of applying liquids to a substrate. Suitable methods for contacting the substrate with a solution of the activation composition are, but are not limited to, dripping, spraying, rolling, brushing, dipping, pouring, immersion, curtain coating, and electrocoating. Of these, spray application is preferred, and may be carried out using small sprayers or large sprayers on a traverse mechanism. Spray application is particularly efficacious and practical in the case of flat glass substrates, for example during the industrial manufacture of flat mirrors, in which sheets of glass pass through successive stations where sensitization, activation and then silvering reagents are sprayed.

It has been observed that the substrate may be effectively activated by a rapid treatment using the specified activating solution. It has been observed that the substrate/activating solution contact time may be very short, for example around a few seconds only. In practice, in the industrial production of flat mirrors, the sheet of glass moves along a mirror production line on which the glass passes through an activation station where the activating solution is sprayed, then through a rinsing station and afterwards through the silvering station.

Preferably, before using a substrate in the method of the present invention, the substrate is cleaned. While not intending to be bound by theory, it is believed that this can be an important step, as contaminants can have a very negative effect on the finished product. Typically, the cleaning is done as known in the art, e.g., by washing with water, optionally containing a surfactant solution as known in the art (e.g. a 0.1% surfactant solution, e.g. Deterlon K3/Valspar) and optionally scrubbing using a cerium oxide based slurry or a cerium oxide based slurry optionally comprising one or more compounds selected from chalk, iron oxide and the like. Other compounds may be used in conjunction with the cerium oxide, or may replace the cerium oxide entirely.

After the substrate surface has been cleaned and preferably rinsed, it is optionally then sensitized using, for example, conventional sensitizing solutions. In general a conventional stannous ion solution, including $SnCl_2$, $SnF_2$, $SnI_2$, $SnBr_2$, but most typically a $SnCl_2$ solution is applied to the substrate. The sensitizing solution can be applied to the glass surface by pouring, immersing, dipping, spraying or rinsing the solution over the glass surface. An acidic stannous solution is generally used to sensitize the glass surface, although the stannous solution alone can be used if it is prepared shortly before use. A stannous ion concentration 10-1000 mg/l and a pH of 2-5 is typically employed but these sensitizing solutions may vary widely in composition and concentration. This sensitizing solution is typically in contact with the substrate just long enough to adsorb a thin layer of molecules (e.g., ions or ion complexes) onto the substrate surface. The time varies depending on the concentration used, but is often less than 30 seconds, and preferably less than 20 seconds. Following the addition of the sensitizer, the substrate is rinsed with deionised water.

Generally, said optional sensitizing step can be carried out prior, after or simultaneously to an activating (supersensitizing) step. However, it has been observed that the order of the steps seems to be important to obtain good durability. Therefore, carrying out said optional sensitizing step prior to the activating step is preferred. This observation is surprising because the activation treatment does not really produce a distinct continuous layer containing the at least one cation or the corresponding neutral element, respectively, but the at least one cation or the corresponding neutral element, respectively, can be found in the form of islets on the surface of the glass. An analysis of the surface of glass treated with a sensitizing solution containing tin (II) chloride followed by an activating solution according to the present invention shows the presence of a certain proportion of atoms or ions (corresponding to the at least one cation applied with the activation solution) with respect to tin atoms at the glass surface.

After optionally cleaning the substrate, optionally sensitizing the substrate, and activating the substrate as described above a layer of metal (e.g., reflective metal) is coated onto the substrate according methods and techniques known in the art. For example the metal, preferably reflective metal, may be applied to the substrate by a variety of methods including metallizing, electrical deposition, and electroless deposition. In the mirror production process, the method of electroless deposition is generally used both for speed and cost reasons. This electroless deposition process includes several steps in order to change the starting substrate into the finished product. In production plants, these steps are generally conducted on the substrate as it moves on a conveyor through the different stages. For superior production, de-ionized water should be used in all steps, preferably having at least a 1 million-ohm resistance.

In a preferred embodiment silver is used as a reflective metal. Such a silver coating can be applied to the optionally sensitized, activated, glass surface following conventional coating techniques such as described in U.S. Pat. No. 4,737, 188. Basically, a silver solution and a reducing solution are brought together before or at contact with the substrate to be silvered by pouring or metering the solutions such that they meet just before contact with the substrate. Alternatively, the component solutions may be sprayed using an air or airless system prior to or simultaneously with intermixing at the surface of the substrate.

These component solutions may be mixed together before use, may be mixed just prior to spraying, or sprayed independently onto the glass. Preferably they are each mixed into the same water stream just prior to the point of spraying. The ionic silver solution can be any solution in which the silver is present in the ionic state and is sufficiently soluble in water for easy application and reaction with the reducing solution. Therefore, the ionic silver solution can be formed from silver salts, silver complexes, or coordination compounds. Ammonia is the preferred complexing agent, and is used to form an ammoniated silver nitrate solution. The reducing solution can be formed from invert sugars, N-methylglucamine, D-glucamine, glucono-delta-lactone, glucosaminic acid, or other compounds known in the art as reducing agents. Usually the reducing solution will also be mixed with a sodium hydroxide or ammonium hydroxide in order to create the proper alkaline pH for the reaction to proceed. The silvering solution is typically in contact with the substrate long enough to create the proper metal film thickness. The time varies depending on the concentration used and the reaction conditions, but is often less than two minutes and is preferably one minute or less. Depending on anticipated use and quality desired, the silver thickness is generally more than 500 milligrams of silver per square meter of substrate. More preferably it will be more than 600 milligrams per square meter, and most preferably will be more than 800 milligrams per square meter. Usually the silver thickness is generally less than 1400 milligrams of silver per square meter of substrate, preferably less than 1000 milligrams per square meter, and more preferably less than 900 milligrams per square meter. Following the silvering solutions, the substrate is again rinsed with deionised water.

The layer of silver may be deposited in the form of a silver coating which is fairly thin so that it is transparent. Flat glass substrates carrying such transparent coatings are used to form glazing panels which reduce the emission of infrared radiation and/or which protect from solar radiation. Thus according to one embodiment of the invention the thickness of the layer of silver formed in said silvering step is between 8 nm and 70 nm, preferably between 8 nm and 30 nm. According to another embodiments of the invention, where the product is a mirror, for example a domestic mirror or a vehicle rear-view mirror the thickness of the layer of silver formed in said silvering step is between 70 nm and 100 nm n.

It is conventional to protect the silver coating with an overcoating of copper to retard tarnishing of the silver layer. The copper layer is itself protected from abrasion and corrosion by a layer of paint. Historically, those paint formulations which afford the best protection against corrosion of the copper layer contain lead pigments. The use of lead pigments is being discouraged. Furthermore, the addition of a copper layer adds time and expense to the mirror making. Therefore, creating a final product that has high performance without a copper layer is desirable. According to the present invention, although possible, a conventional protective layer of copper is not necessary and therefore, paint formulations containing lead pigment are not necessary.

Alternatively, it has been proposed to protect the silver coating by treatment with an acidified aqueous solution of Sn (II) salt (see British patent application GB 2252568). According to another proposal, the silver coating is protected by treatment with a solution containing at least one of Cr (II), V (II or III), Ti (II or III), Fe (II), In (I or II), Cu (I) and Al (III) (see British patent application GB 2254339).

Furthermore, it is known to apply a tin precipitate on top of the silver layer, which optionally can be further treated with a silane solution, see, e.g., U.S. Pat. Nos. 6,017,580; 6,218,019; and 6,432,200 (Soltys). Alternatively the silver layer can be protected by a treatment with a tin salt and a silane.

To protect the silver layer one of the above prior art processes or the process for improving the corrosion resistance according to the co-pending patent application (U.S. application Ser. No. 11/919,785 filed Mar. 29, 2006) can be used in the process of the present invention, which application is hereby incorporated by reference.

After application of the protective/barrier layer the substrate is pre-heated. Prior to this stage, the substrate should be rinsed and air blowers used to remove all free water from the surface. In this stage, the substrate will be heated to dry water vapor from the substrate and warm up the substrate for the final coating. The temperature used suitably is in the range of 30°-80° C., preferably in the range of 54°-71° C. The preferred preheating time is usually in the range of 30 s to 2 min and more preferably approximately 1 minute. As the water and water vapor is driven off, this stage increases adhesion of the metallic layer to the glass surface and also enables the final coating to have superior performance.

The silver coating, protected as mentioned above or not protected, may be covered with one or more protective paint layers. While all paints known in the art can be used, according to a preferred aspect of this invention such a paint can be free, or substantially free, of lead.

In case a final outside coating is applied, such a coating can be free, or substantially free, of lead and can be based on alkyd, acrylic, epoxy and polyurethane based resins known in the art (e.g. Valspar SK1390 and SK1395). Furthermore, the protective paint layer can be applied in form of a powder coating, a water borne coating or a liquid solvent based coating, which coatings can be based on alkyd, acrylic, epoxy and polyurethane based resins known in the art. Optionally, this protective paint may consist of a base coat and at least one top coat, or the protective paint may consist of a single final coating based on alkyd, acrylic, epoxy and polyurethane based resins e.g. Valspar SK1420. Also leaded paints, although not necessary, are useable like Valspar SKI 750 single coat. These coatings may be sprayed on, brushed on, rolled on, applied via a curtain coating, applied by using an electrostatic process, or by using other techniques. Preferably, curtain coating will be used for a liquid coating, and electrostatic application for a powder coating.

Generally, the final coating is highly resistant to the environment and also helps to physically protect the layers. The preferred final coating will therefore be both light and strong. The final coating may be a leaded paint, a paint without lead, or a powder coating, for example, on the basis of an epoxy resin e.g. Valspar X98-47-1. After application, the coating may optionally be cured, e.g., using heat, UV-, IR-, NIR-, or e-beam radiation.

Preferably, the protective paint layer applied according to the present invention has a thickness of 10-100 µm, preferably of 20-50 µm in case of a one layer protective paint and has a thickness of 10-100 µm, preferably of 30-70 µm in case of a two layer protective paint. In addition, in some instances a further UV-stable outer coating can be applied on top of the protective paint layer in a thickness of 2-10 µm. These UV-stable outer coatings usually are epoxy based products known in the art.

The next step may include optional final washing and final drying. This is to clean any overspray of silver or final outside coating and any other particles that may be on the final substrate. This cleaning may involve the use of ferric salts rubbed against the substrate with rubber rollers. After the washing, there is usually an optional final drying step. This dries the mirror and removes free water and water vapor from the final product. The final washing and drying steps help ensure that the substrate is clean. In addition to removing overspray, the final steps help decrease tackiness of the final coating and help remove any possible contaminants from the surfaces that may damage the substrates when they are stacked or stored together.

According to a fifth embodiment an article is provided having a metal coating (preferably a reflective metal coating) on a substrate, which article is obtainable by any of the methods of said first to fourth embodiment.

According to a sixth embodiment of the invention, there is provided a mirror comprising a substrate, e.g. glass or plastic, carrying a silver coating obtainable by any of the methods of said first to fourth embodiment. According to a preferred embodiment of the present invention a mirror carrying a silver coating produced by any of the first to fourth embodiment of the invention does not comprise a protective layer of copper, i.e., is a copper-free mirror. Nevertheless, these copper-free mirrors according to the present invention can be finished according to conventional processes, or preferably, are finished as described in Applicants' co-pending patent application (U.S. application Ser. No. 11/919,785 filed Mar. 29, 2006), which application is herein incorporated by reference.

Test Methods

The degree of adhesion of the silver coating to the glass can also be observed by subjecting the product to an accelerated ageing test such as the CASS Test or Salt Fog Test. It is sometimes found that the product subjected to such tests has a certain edge corrosion and/or light diffusing specks ("white specks").

Copper-Accelerated Acetic Acid Salt Spray Test (CASS)

This test follows the ISO 9227 standard except that the samples in this test were placed like a rhombus. The upwards side will be judged. The edge corrosion will be measured with a WILD-Microscope with calibrated Reticule measuring device. The surface corrosion is appraised by visual inspection with a halogen light.

Humidity Test

The Humidity Test follows the DIN 50 017 standard except the used temperature is 50° C.

Salt Spray Test

The Salt Spray test method used by mirror manufacturers in North American is described in the new mirror standard ASTM C-1503-01, in accordance with ASTM B-117, except that the salt (sodium chloride) solution used is 20+/−1% by weight sodium chloride. The test duration is 300 hours, and is performed at 33 to 36° C. The maximum edge corrosion allowed is 3.0 mm, while the maximum number of spot blemishes is 5, which can not exceed 0.5 mm in diameter. The sample size: 15 cm×15 cm.

The spot failures are determined by examining mirror panels at a distance of 0.46 m from the eyes, at a 45 degree angle, under two 40 watt fluorescent lamps located one meter above. The details are spelled out in ASTM C-1503.01, and ASTM B-117.97.

EXAMPLES

Preparation of a Sample According to a Standard Process

Example 1

Formulation of the solutions (all solutions are diluted to the given concentrations with deionised water):
  Solution 1: 0.1% surfactant solution (Deterlon K3/Valspar)
  Solution 2: 5% cerium oxide (CERI 2645-Pieplow&Brandt)
  Solution 3: 0.04% RNA solution (Valspar/stannous chloride solution)
  Solution 4: 0.02% RNG 7252 solution (Valspar/palladium dichloride)
  Solution 5: 5% GMP-MS silver solution (Valspar)
  Solution 6: 5% GMP-MA reduction solution (Valspar)
  Solution 7: 0.5% GMP-A metallizing solution (Valspar)
  Solution 8: 0.5% GMP-B silanization solution (Valspar)

Preliminary Purification of the Glass Plates (0.75 m×0.45 m), Followed by Polishing The flat glass is preliminarily purified with 200 ml of solution 1 by means of a sponge. Subsequently, the glass is rinsed with deionised water. The glass is polished with 200 ml of solution 2 by means of a felt-coated vibrating grinder for 90 seconds and rinsed with deionised water.

Sensitization of the Glass

The glass is sensitized by pouring 170 ml of solution 3 onto it for 20 seconds. Subsequently it is rinsed with deionised water.

Activation of the Glass

The glass is activated by pouring 250 ml of solution 4 onto it. The solution remains on the surface for 45 seconds. Subsequently, the surface is rinsed with deionised water.

Silver-Plating of the Glass

The glass plate is silvered by first spraying it with solution 5 and subsequently spraying it with a combination of solutions 5 and 6 (1:1 ratio) in an amount of 380-400 ml/m². The solutions are sprayed on by means of a pressurized vessel so that they mix on the glass surface. Silvering takes place at a glass temperature of 28 to 30° C. The solutions remain on the glass for 45 seconds. Subsequently, the glass is rinsed with deionised water.

Passivation of the Silver

Solutions 7 and 8 (1:1 ratio) in an amount of 180-240 ml/m² are sprayed onto the silver from a pressurized vessel so that they mix on the glass surface. 180 to 240 ml/m² are applied. Subsequently, the surface is rinsed with deionised water.

Lacquer Coating

The coated glass is pre-dried with air prior to coating it with lacquer and afterwards dried for 24 h at room temperature. The lacquers, base lacquer Valspar SK 1390 and finishing lacquer Valspar SK 1395, are applied by means of a Burkle casting machine at dry thicknesses between 22 and 28 µm. A total thickness of the layer of 50 µm is aimed at. The lacquers are baked at temperatures of 140 to 150° C. for 3 to 3.5 minutes in a continuous IR-furnace.

Preparation of Samples According to the Present Invention

Examples 2-21

For the preparation of examples 2-21 the above standard process (example 1) is followed except for the activation step. In examples 2-21 solution 4 is prepared at various concentrations with the corresponding metal ions used according to the present invention.

Result of the Test Samples

As can be seen from the examples 2-21 the metal ions used according to the present invention provide good corrosion properties. The silver coated samples show in terms of CASS test a low average edge corrosion at a reasonable low price compared to palladium.

Use of Tellurium for Activation

Example 22-25

CASS Test performed in these examples conforms to D.I.N. 50021.

Example 22

Several samples were prepared to determine the effectiveness of tellurium for activation.

Samples on a mirror line have been prepared utilizing normal glass cleaning with cerium oxide. The panels were sensitized with stannous chloride at a stannous chloride loading level of 1:5000 and rinsed. An activation solution was then applied to the glass surface, allowed to react for a short time interval (10 seconds), and then rinsed. The panels were then placed back on the conveyor, and a commercial silvering system was sprayed on the panels to deposit a silver film. The silvered panels were then rinsed with deionized water, and a stannic oxide coating was applied to the silver film as disclosed in U.S. Pat. No. 6,017,580. All of the panels were painted with a one coat mirror backing paint (a single coat-

|  | Metal ion | Amount[1] mg/m² | CASS Test average of 3 samples | Humidity Test |
|---|---|---|---|---|
| Ex. 1 | Palladium(II)-chloride | 6 | 180 µm | No change |
| Ex. 2 | Europium(III)-chloride hexahydrate | 1.9 | 290 µm | No change |
| Ex. 3 | Neodymium(III)-chloride hexahydrate | 2.7 | 220 µm | No change |
| Ex. 4 | Neodymium(III)-chloride hexahydrate | 26.6 | 240 µm | No change |
| Ex. 5 | Antimony(III)-chloride | 1.7 | 250 µm | No change |
| Ex. 6 | Praesodymium(III)-chloride hexahydrate | 2.6 | 230 µm | No change |
| Ex. 7 | Praesodymium(III)-chloride hexahydrate | 26.3 | 230 µm | No change |
| Ex. 8 | Praesodymium(III)-chloride hexahydrate | 52.6 | 200 µm | No change |
| Ex. 9 | Europium(III)-chloride hexahydrate | 19.1 | 270 µm | No change |
|  | Cerium(III)-chloride heptahydrate | 13.8 |  |  |
| Ex. 10 | Europium(III)-chloride hexahydrate | 19.1 | 270 µm | No change |
|  | Cerium(III)-chloride heptahydrate | 27.6 |  |  |
| Ex. 11 | Europium(III)-chloride hexahydrate | 28.7 | 240 µm | No change |
|  | Cerium(III)-chloride heptahydrate | 27.6 |  |  |
| Ex. 12 | Neodymium(III)-chloride hexahydrate | 26.6 | 270 µm | No change |
|  | Manganese(II)-acetate tetrahydrate | 9.1 |  |  |
| Ex. 13 | Neodymium(III)-chloride hexahydrate | 26.6 | 240 µm | No change |
|  | Aluminium sulfate hydrate | 23.3 |  |  |
| Ex. 14 | Praesodymium(III)-chloride hexahydrate | 26.3 | 220 µm | No change |
|  | Manganese(II)-acetate tetrahydrate | 9.1 |  |  |
| Ex. 15 | Cerium(III)-chloride heptahydrate | 2.8 | 270 µm | No change |
|  | Aluminium sulfate hydrate | 23.3 |  |  |
| Ex. 16 | Tungsten(IV)-silicide (WSi₂) | 1.8 | 270 µm | No change |
| Ex. 17 | Tungsten(IV)-silicide (WSi₂) | 533.4 | 280 µm | No change |
| Ex. 18 | Lanthanum (III)-nitrate hydrate | 48.1 | 450 µm | No change |
| Ex. 19 | Samarium (III)-nitrate hexahydrate | 33.0 | 380 µm | No change |
| Ex. 20 | Samarium (III)-nitrate hexahydrate | 33.0 | 240 µm | No change |
|  | Cerium(III)-chloride Heptahydrate | 20.7 |  |  |
| Ex. 21 | Tellurium dioxide in 10 g/l Hydrochloric acid | 6.0 | 260 µm | No change |

[1] The used amounts are calculated as the cation alkyd/melamine-based paint), and the paint was cured in a medium wave infrared oven for 2.5 minutes.

A control sample was prepared using palladium chloride as the activating compound. The palladium chloride was applied at the rate of 5.49 mg per $m^2$, at a pH of 4.0. The first sample according to the present invention was prepared by using a solution of tellurium chloride in demineralized water as the activation solution. The activation solution has been acidified with hydrochloric acid. The tellurium was applied at the rate of 5.49 mg per $m^2$. A second sample was prepared by doubling the tellurium application rate to 10.98 mg per $m^2$. A third sample was prepared by diluting the tellurium process solution with deionized water to give a tellurium application rate of 2.04 mg per $m^2$. The application pH of the tellurium activation solution was in the 4.0 to 5.0 range.

CASS testing was performed on all of the aforementioned samples. The average edge corrosion on the control samples, and samples obtained from the three tellurium-treated panels were in the 250 to 300 micron range. The number of corrosion spots found on each test panel was similar in number and size.

Example 23

Mirror glass was cleaned in the normal fashion, with a mixture of cerium oxide, a detergent, and water. After rinsing, an acidified solution of stannous chloride (see example 22) was applied to the glass, and then rinsed.

The sensitized glass was then treated with a solution containing 6 milligrams (calculated as the cation) per liter of tellurium chloride in demineralized water at a rate of 183 ml per $m^2$ to give 1.08 mg per $m^2$ of glass. After 30 seconds, the treated glass was rinsed, and a silver film was deposited on the glass by the method described in U.S. Pat. No. 4,737,188 to Bahls. After rinsing, an insoluble coating of tin (IV) oxide was deposited on the silver film, in a method described in U.S. Pat. No. 6,017,580. A single coat of leaded mirror paint was applied to the deposited metal coatings, which resulted in the deposition of a paint film with a dry film thickness of 30.5 to 38.1 sun. After the paint was cured in a medium wavelength infrared oven, samples were obtained from the mirrors and placed in a CASS test cabinet. After the 120-hour test period, no corrosion spots were found on the reflective surface of the test samples, and corrosion on the edges of the test panels averaged 200 μm, which compared favorably to control panels made with 5.49 mg per $m^2$ of the standard, but more expensive, palladium chloride activator.

Example 24

The glass was activated with a solution containing 12 milligrams (calculated as the cation) of tellurium chloride per liter in demineralized water at a rate of 183 ml per $m^2$ to give 2.15 milligrams of Tellurium per $m^2$ of glass. The CASS test results were essentially the same as those detailed in example 23.

Example 25

The glass was treated with a solution containing 3 milligrams of tellurium chloride (calculated as the cation) per liter in demineralized water at a rate of 183 ml per $m^2$ to give 0.54 milligrams of tellurium per $m^2$ of glass. The CASS test panels showed about the same edge corrosion as that found on the mirrors described in examples 23 and 24, but some spotting was evident on the reflective surface, though considerably less than control "blank" panels made without a activator.

Use of the at Least One Metal Ion in a Multiple Step Treatment

Example 26-33

Several samples were prepared to determine the effectiveness of the at least one metal ion in a multiple step treatment. The process as described for examples 9-15 and 20 has been followed except that no mixtures of the at least one metal ion have been applied but the solutions of the at least one metal ions have been applied one after the other. In these examples after application of Tellurium dioxide and before the application of Erbium (III)-chloride the glass was rinsed with deionised water.

The rinsing step is not essential. Alternatively, after application of the Tellurium dioxide one could wait few seconds (2-5 s) before Erbium (III)-chloride is applied.

|  | Metal ion | Amount[1] mg/$m^2$ | CASS Test average of 3 samples | Humidity Test av. of 3 samples |
|---|---|---|---|---|
| Ex. 26 | Tellurium dioxide | 5.91 | 280 μm | No change |
|  | Erbium (III)-chloride | 14.14 |  |  |
| Ex. 27 | Tellurium dioxide | 5.91 | 430 μm | No change |
|  | Erbium (III)-chloride | 28.27 |  |  |
| Ex. 28 | Tellurium dioxide | 3.55 | 470 μm | No change |
|  | Erbium (III)-chloride | 28.27 |  |  |
| Ex. 29 | Tellurium dioxide | 1.18 | 420 μm | No change |
|  | Erbium (III)-chloride | 28.27 |  |  |
| Ex. 30 | Tellurium dioxide | 1.18 | 550 μm | No change |
|  | Erbium (III)-chloride | 14.14 |  |  |
| Ex. 31 | Tellurium dioxide | 1.18 | 210 μm | No change |
|  | Erbium (III)-chloride | 28.27 |  |  |
| Ex. 32 | Tellurium dioxide | 2.36 | 210 μm | No change |
|  | Erbium (III)-chloride | 28.27 |  |  |
| Ex. 33 | Tellurium dioxide | 2.36 | 190 μm | No change |
|  | Erbium (III)-chloride | 14.14 |  |  |

[1]The used amounts are calculated as the cation

Use of Bismuth as Activator

Reference Example 34 and 35 and Example 36

The following tests show the usefulness of alkaline Bismuth as activator according to the present invention.

Reference Example 34 and 35, Example 36 and the control consisted of manufacturing a mirror on a conveyor (manufactured by Klopper, Sommer and Maca (Somaca), and Century Engineering) whose glass dimension was 183 cm×244 cm. The tests have been carried out on three separate mirror lines at different times and the results could be reproduced.

First the glass was cleaned as described in example 1 above. Then a sensitizing step has been carried out in a conventional matter using a sensitizing solution RNA-H (Valspar; stannous chloride in water). The RNA-H Tin Sensitizing concentrate was applied to the cleaned glass surface at a dosing rate of 1:5000 (stannous chloride:water) as stannous chloride dihydrate, and at a solution loading rate of 380 to 500 ml of diluted stannous chloride per square meter. Subsequently the glass was rinsed with deionised water.

In the next step an activator has been applied. As a control Palladium Chloride solution in water has been used in a concentration on 5.5 mg Pd/m². The pH of the control solution was 3.5 (control 1) or 4.5 (control 2). In Reference Example 34 and 35 a bismuth nitrate solution (97 g Bi(NO$_3$)$_3$/l) containing glucono-delta-lactone (GDL-one; 98 g/l) in water has been used (amount: Reference Example 34: 1.0 mg/m² substrate; Reference Example 35: 1.5 mg/m² substrate). The pH of this solution was 3.5.

In Example 36 the bismuth nitrate solution of Reference Example 34 or 35 containing GDL-one was mixed with a solution containing silver nitrate dissolved in aqueous ammonia. The pH of the resulting mixture was 9.0. The mixture was applied to the glass via a spray bar. The concentrations on the glass were 1.18 mg Bi/m² and 1.72 mg Ag/m². Subsequently the glass was rinsed with deionised water.

The glass was silvered using MS-400 Silver Solution (commercially available from Valspar; 120 g AgNO$_3$/l and 420-500 ml of 19% ammonia/l) and MA-300 Reducer (commercially available from Valspar). The silver film thickness on the experimental panels coated with the MS-400/MA-300 system was 800-850 milligrams per m². The silver film was applied in a conventional manner. Subsequently the glass was rinsed with deionised water.

For passivation of the silver coated substrate a GMP-Tin Oxide Coating (Valspar; 108 mg SnF$_2$/m²; 269-367 ml SnF$_2$ solution/m² on the silver coated substrate) has been formed in a usual manner. Subsequently the glass was rinsed with deionised water.

After rinsing with water the coated glass was warmed up 1-2 min to 40-60° C. in a pre-heat section. Then a paint (US leaded 1-coat alkyd paint; lead content 3% by weight; commercially available as 4201G13001 Woodlands Green mirror backing paint) was applied. The mirror with the applied paint was then heat treated at 130-145° C. in an IR oven.

Approximately 15 cm of the front and rear edge of the glass panel was cut and removed in order to eliminate original paint edges. Then the mirror stock sheets were sub-divided in 15 cm×15 cm samples which were used for the CASS and Salt Spray Tests.

The results tabulated were from an average edge failure from all 4 edges of each sample. Spot failures were minimal with the Alkaline Silver/Bismuth Super Sensitizer averaging less than 1 spot failure for all samples.

| Example | Paint Type | Activator | Amount[1] mg/m² | pH | 300 Hours Salt Test Average Edge Failure | 120 Hours CASS Testing[2] Average Edge Failure |
|---|---|---|---|---|---|---|
| Control 1 | Alkyd Leaded Paint | Palladium(II)-chloride | 5.5 | 3.5 | 90 μm | 250 μm |
| Control 2 | Alkyd Leaded Paint | Palladium(II)-chloride | 5.5 | 4.5 | 90 μm | 250 μm |
| Reference 34 | Alkyd Leaded Paint | Acidic Bismuth | 1.0 | 3.5 | 1000 μm | 1900 μm |
| Reference 35 | Alkyd Leaded Paint | Acidic Bismuth | 1.5 | 3.5 | 1000 μm | 1900 μm |
| 36 | Alkyd Leaded Paint | Alkaline Bismuth/ Silver | 1.18 1.72 | 9.0 | 90 μm | 240 μm |

[1] The used amounts are calculated as the cation
[2] The CASS Test performed on the test specimens conforms to D.I.N. 50021

A number of embodiments of the invention have been described. Nevertheless, it will be understood that various modifications may be made without departing from the spirit and scope of the invention. Accordingly, other embodiments are within the scope of the following claims.

The invention claimed is:

1. A method for making an article, comprising:
   providing a substrate comprising at least one of ceramic, glass, and polymeric materials;
   contacting a surface of said substrate with a solution comprising at least one of a Ga, W, Al, Mn, Mo, Sb or Te metal ion or mixtures thereof at a concentration of about 0.01 to 3 mmol/l and pH of about 4.0 to 6.0 to form an activated surface on the substrate; and
   applying a metal coating on said activated surface of said substrate, wherein the solution does not contain Pd(II) ions, and wherein the article is copper-free.

2. The method of claim 1, wherein the solution comprises a mixture of metal ions.

3. The method of claim 1, comprising contacting the surface of said substrate with more than one solution, each solution comprising at least one metal ion selected from Ga, W, Al, Mn, Mo, Sb or Te.

4. The method according to claim 1, wherein the at least one metal ion is selected from the group consisting of Ga(II), W(II), W(IV), Al(III), Mn(II), Mo(IV), Mo(VI), Sb(III), and Te(IV).

5. The method according to claim 1, wherein two different metal ions of the at least one metal ion are applied in two solutions one after another in two separate treating steps, optionally with a rinsing step in between.

6. The method according to claim 1, wherein the solution comprises the at least one metal ion and an aqueous carrier.

7. The method according to claim 6, wherein the aqueous carrier is water.

8. The method according to claim 1, wherein the substrate is glass.

9. The method according to claim 1, wherein the metal coating on the substrate is selected from silver, gold, nickel, lead, ruthenium, chrome and mixtures thereof.

10. The method according to claim 9, wherein the metal coating is silver.

11. The method according to claim 1, wherein the metal is applied on the substrate by a method selected from at least one of metallizing, electrical deposition, and electroless deposition.

12. The method according to claim 1, further comprising, prior to contacting the substrate with the solution, at least one step of cleaning the substrate and sensitizing the substrate.

13. The method according to claim 1 further comprising covering the metal coating on said surface of said substrate with one or more protective paint layers.

14. The method according to claim 1, further comprising contacting the metal coated substrate with a treating composition comprising a film forming organic component.

15. The method of claim 14, wherein the film forming organic component forms a hydrophobic film on the metal coated substrate with a thickness of less than 1 um.

16. The method according to claim 15, wherein the film forming organic component comprises an aromatic triazole compound, a silicone resin and mixtures thereof.

17. The method according to claim 1, wherein the substrate comprises metal particles.

18. The method according to claim 17, wherein the metal particles are metal coated metal particles.

* * * * *

UNITED STATES PATENT AND TRADEMARK OFFICE
CERTIFICATE OF CORRECTION

PATENT NO.       : 8,623,460 B2                                             Page 1 of 1
APPLICATION NO.  : 11/919904
DATED            : January 7, 2014
INVENTOR(S)      : Harry J. Bahls It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

Signed and Sealed this

Twenty-second Day of September, 2015

Michelle K. Lee
*Director of the United States Patent and Trademark Office*